United States Patent [19]
Clegg

[11] Patent Number: 4,616,904
[45] Date of Patent: Oct. 14, 1986

[54] ULTRAVIOLET BEAM CONCENTRATOR

[76] Inventor: John E. Clegg, 2320 Keystone Dr., Orlando, Fla. 32806

[21] Appl. No.: 671,715

[22] Filed: Nov. 15, 1984

[51] Int. Cl.⁴ .................. G02B 13/18; G02B 17/00
[52] U.S. Cl. ...................... 350/432; 350/443
[58] Field of Search .................. 550/432, 443

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

OTHER PUBLICATIONS

Rioux et al; "Linear, Annular, and Radial Focusing w/Axicons . . . "; *Applied Optics;* vol. 17, No. 10; May 15, 1978; pp. 1532-1536.

*Primary Examiner*—John K. Corbin
*Assistant Examiner*—Scott J. Sugarman

[57] ABSTRACT

A convex-concave conical lens which refracts a convergent conical incipient beam of diffused sunlight and a double convex conical lens which refracts and emits a spectral beam. The blue through red portions of the spectral beam are reflected laterally and the ultraviolet and violet portions are emitted through a conical aperture in the base of the concentrator.

1 Claim, 2 Drawing Figures

ULTRAVIOLET BEAM CONCENTRATOR

BACKGROUND

The code designation of the concentrator is L-TR-RT:CUV (L-reflecting section of a component mirror, R-refracting section of a component lens, T-transmitting section of a component lens, C-concentrating stage lens, UV-ultraviolet).

Prior art is limited to beam concentrators which receive circular whole or annular beams of direct sunlight and emit concentrated nonspectral beams.

DRAWINGS

DESCRIPTION

Figure 1:
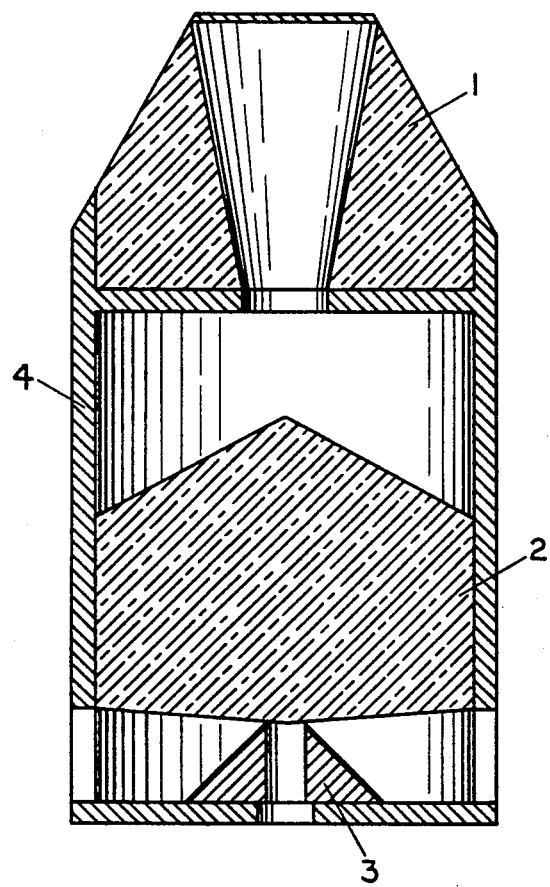
FIG. 1 is an elevation of the ultraviolet beam concentrator with the lenses shown in section.

FIG. 1 shows the ultraviolet beam concentrator with upper component lens RT 1, lower component lens TR 2 and mirror 3 mounted inside casing 4.

Figure 2:
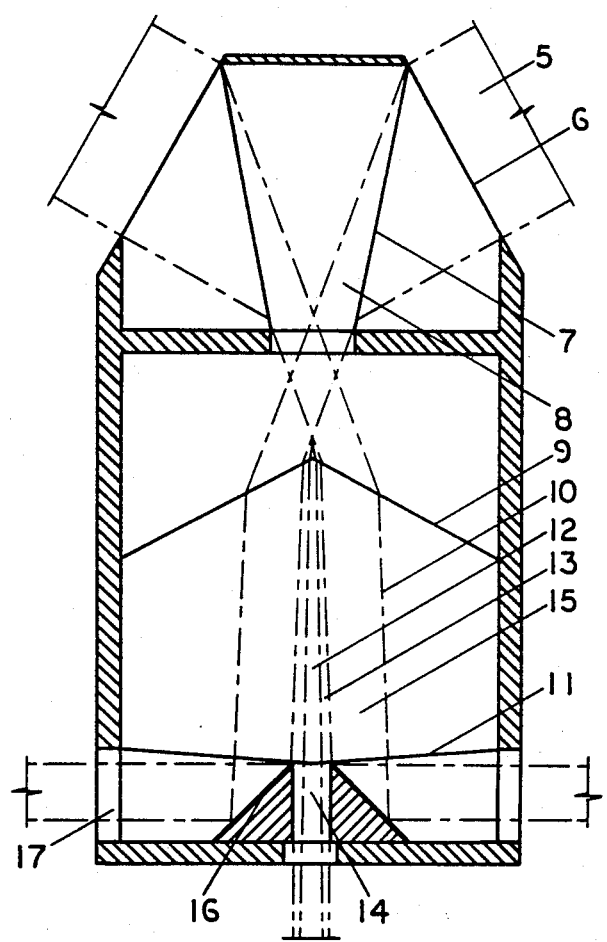
FIG. 2 is an elevation of the concentrator with a ray diagram.

FIG. 2 shows the concentrator with a ray diagram. Convergent conical incipient beam 5 of diffused sunlight is received and transmitted by convex conical section 6 and refracted by concave conical section 7, forming convergent-divergent conical beam 8.

Beam 8 is refracted by convex concial section 9, forming spectral beam 10 which is emitted by convex conical section 11.

The ultraviolet portion 12 and violet portion 13 of spectral beam 10 are emitted through conical aperture 14 in the center of mirror 4. The remaining visible portion 15 is reflected laterally by convex concial reflecting section 16 of mirror 3 and emitted through circular slot 17 in casing 4.

I claim:

1. An ultraviolet beam concentrator L-TR-RT:CUV comprising in general an upper component lens RT which receives and refracts a convergent conical incipient beam of diffused sunlight to form a convergent-divergent conical concentrated beam, a middle component lens TR which receives and refracts said concentrated beam to form a spectral beam, and a conical mirror L which emits the ultraviolet portion of said spectral beam through a conical aperture and which reflects laterally the remaining portion of said spectral beam, and comprising in particular;

an upper component lens RT (1) having a convex conical section (6) which receives and transmits a convergent conical incipient beam (5) of diffused sunlight, said upper component lens RT having a concave conical section (7) which refracts said incipient beam to form a convergent-divergent conical concentrated beam (8), a lower component lens TR (2) mounted below said upper component lens RT, said lower component lens TR having a convex conical section (9) which refracts said concentrated beam to form a spectral beam (10), said lower component lens TR having a convex conical section (11) which emits said spectral beam, and a mirror L (3) mounted below said lower component lens TR, said mirror L having a conical aperture (14) which emits the ultraviolet portion (12) and violet portion (13) of said spectral beam, said mirror L having a convex conical reflective section (16) which reflects the remaining visible portion (15) of said spectral beam laterally through a circular slot (17) in the casing of the ultraviolet beam concentrator.

* * * * *